(12) United States Patent
Goto et al.

(10) Patent No.: US 6,681,068 B2
(45) Date of Patent: Jan. 20, 2004

(54) OPTICAL WAVEGUIDE MODULE-MOUNTED DEVICE

(75) Inventors: Masanori Goto, Tokyo (JP); Tohru Kineri, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/145,407

(22) Filed: May 14, 2002

(65) Prior Publication Data

US 2002/0191922 A1 Dec. 19, 2002

(30) Foreign Application Priority Data

May 15, 2001 (JP) ........................................ 2001-144716

(51) Int. Cl.[7] .............................. G02B 6/36; G02B 6/42
(52) U.S. Cl. ........................................... 385/49; 385/94
(58) Field of Search ............................. 385/92, 94, 99, 385/49

(56) References Cited

U.S. PATENT DOCUMENTS

| | | | | |
|---|---|---|---|---|
| 5,005,942 A | * | 4/1991 | Barlow et al. | 385/135 |
| 5,243,673 A | * | 9/1993 | Johnson et al. | 385/90 |
| 5,463,708 A | * | 10/1995 | Yui et al. | 385/49 |
| 5,696,860 A | * | 12/1997 | Semura et al. | 385/49 |
| 5,857,045 A | * | 1/1999 | Lee | 385/70 |
| 6,443,633 B1 | * | 9/2002 | Liberty et al. | 385/99 |
| 6,553,173 B1 | * | 4/2003 | Goto | 385/137 |

* cited by examiner

*Primary Examiner*—Michael C. Zarroli
(74) *Attorney, Agent, or Firm*—Drinker Biddle & Reath LLP

(57) ABSTRACT

An optical waveguide module-mounted device that includes an optical waveguide module in a separation type case. The module includes an optical waveguide chip and a pair of optical fibers connected to the optical waveguide chip. The fibers are connected such that the optical axes of the chip and the fibers are aligned with each other. The separation type case has an optical-fiber lead-in portion and an optical-fiber lead-in groove. The optical-fiber lead-in portion has an optical-fiber open groove at open portion of the separation type case. The optical-fiber open groove leads the optical fiber out of the separation type case. The optical-fiber lead-in groove positions the optical fiber and is connected to the inner end of the open groove. The optical-fiber open groove is deeper than the optical-fiber lead-in groove.

16 Claims, 4 Drawing Sheets

OPTICAL WAVEGUIDE MODULE-MOUNTED DEVICE

FIELD OF THE INVENTION

The present invention relates to an optical waveguide module-mounted device which comprises a case and an optical waveguide module mounted in the case, the module being comprised of an optical waveguide chip and optical fibers connected to the chip. More particularly, the present invention relates to an optical waveguide module-mounted device used in the field of optical communication.

BACKGROUND OF THE INVENTION

RELATED ART

The recent development of optical communication technology has demanded optical waveguide module-mounted devices, such as optical branching elements and optical multiplexers, with higher cost performance and higher reliability. In general, the conventional optical waveguide module-mounted device is composed of an optical waveguide chip and optical fibers for optical input/output, connected to the terminal end surfaces of the optical waveguide chip.

When the optical waveguide module is put in use in communication system, it is generally necessary to protect the module by a package to enhance the reliability. The package provides resistance to external mechanical impact, thereby improving long-term reliability. When an optical waveguide is connected to optical fibers, a UV-setting resin is generally used as an adhesive for connection. It is known that the long-term adhesive property of the UV-setting resin is deteriorated due to intrusion of moisture. Therefore, it is of importance that the connecting portion of the optical waveguide module is protected by a case or similar means so that the connecting portion is not exposed to moisture (see Japanese Patent No. 3,070,028).

FIG. 1 shows a longitudinal cross section of a conventional optical waveguide module-mounted device, which comprises an optical waveguide module composed of optical fibers 1 and an optical waveguide chip 2, connected in such manner that their axes are aligned with each other, and a cylindrical case 4 in which the module is fixed via element-fixing members 3. The optical fibers 1 are fixed in position with optical-fiber lead-in members 5. The optical fibers 1 and the optical waveguide chip 2 are enclosed by the cylindrical case 4 and the optical-fiber lead-in members 5.

FIG. 2 shows a cross section of another conventional optical waveguide module-mounted device. An optical waveguide module comprising optical fibers 1 and an optical waveguide chip 2, connected in such manner that their axes are aligned with each other, is fixed to a lower half case 6 (the case is formed of an upper half case and a lower half case) by resin 7. The optical fibers 1 are fixed in position with optical-fiber lead-in members 5, and the optical waveguide module-mounted device is sealed with the upper half case 8 of the upper-lower separation type case. The optical fiber 1 and the optical waveguide chip 2 are enclosed by the lower half case 6 and the upper half case 8 of the upper-lower separation type case and the optical-fiber lead-in members 5.

The optical-fiber lead-in member 5, used in conventional optical waveguide module-mounted devices as shown in FIGS. 1 and 2, is typically made of a flexible gummy resin, in order to enhance bending strength reliability of the optical fibers. FIG. 3 shows a condition of the conventional device, when the optical fiber is bent. As shown in FIG. 3, even when the bending direction of the optical fiber 1 is changed by external force, the lead-in member 5 is flexible enough to absorb the bend, thereby maintaining bending strength reliability of the optical fiber.

However, the structure of the conventional optical waveguide module-mounted device shown in FIG. 1 has problems in that, in order to fix the optical waveguide module comprised of the optical waveguide chip and the optical fibers connected to the chip to the inside of the cylindrical case, it is necessary to pass the optical waveguide module through the cylindrical case and the optical fibers through the optical-fiber lead-in members. In addition, for adhesion of the optical waveguide chip to the cylindrical-case via element-fixing members, special jigs are required due to the cylindrical shape. Further, the fixing portion cannot be visually checked from above the case and thus the workability becomes poor, resulting in additional working processes.

On the other hand, since the conventional optical waveguide module-mounted device shown in FIG. 2 is in the form of a box comprising an upper half and a lower half, as compared with the conventional case shown in FIG. 1, this shape allows visual checking of the portion of fixing the optical waveguide module to the case from above, and the workability is improved, leading to less working steps. However, more parts are necessary in this device, resulting in higher cost and more assembling steps, and the resultant device becomes costly.

In order to solve the above-mentioned problems, the present inventors proposed an optical waveguide module-mounted device formed of upper-lower separation type case member in co-pending U.S. patent application Ser. No. 10/104594, filed on Mar. 27, 2002 (based on Japanese Patent Application No. 2001-089644), assigned to the same assignee, which is incorporated herein by reference). Specifically, as shown in FIG. 4, an optical waveguide module comprising optical fibers 19 and an optical waveguide chip 18, connected in such manner that their axes are aligned with each other, is fixed to an optical waveguide-chip fixing groove of a lower half case 12 (the case is formed of an upper half case 11 and a lower half case 12) by resin (for fixing optical waveguide chip) 22. The optical fiber 19 is passed through an optical-fiber lead-in groove 13 and fixed in position by a sealant 21. At an internal position of the case, the optical fiber is further fixed to an optical-fiber fixing groove 14 by a resin (for fixing optical fiber) 20. The fixed fiber is sealed with the upper half case 11. The optical fibers 19 and the optical waveguide chip 18 are enclosed by the upper half case 11 and the lower half case 12.

Problems to be Solved by the Invention

In the case of the optical waveguide module-mounted device shown in FIG. 4, i.e. the device described in the prior application by the present inventors (U.S. patent application Ser. No. 10/104594), the case member is provided with the optical waveguide-chip fixing groove 17, the optical-fiber lead-in portions 13 and the optical-fiber fixing grooves 14, which is different feature from the conventional devices shown in FIGS. 1 and 2. With this multi-functional integrated upper-lower separation type case, the number of parts can be reduced and assemblage can be easily conducted. However, the multi-functional integrated upper-lower separation type case, used in the optical waveguide module-mounted device shown in FIG. 4, is generally made of a resin by injection molding or a metal by metal injection, from the viewpoint of lowering production cost. The resultant optical-fiber lead-in portion is rigid and hard. Therefore, the case has a problem in that, when the optical fibers are bent by external force at portions where the optical fibers are led out of the case, friction between the fiber and the case occurs, which may lower the quality of the optical fibers, resulting in low liability of the optical fibers.

In brief, the optical waveguide module-mounted device comprising the multi-functional integrated upper-lower separation type case shown in FIG. 4 has advantages of reducing the number of parts. In addition, since the case is comprised of open half cases, it is allowed to visually check the portions of fixing the optical waveguide module to the case from above and below, and thus the workability is improved, leading to less working steps. However, the case also has disadvantages in that, since the optical-fiber lead-in portions are made of a rigid resin or metal, bending strength reliability of the optical fibers is lowered when the optical fibers are abraded by the rigid case at the open potions.

SUMMARY OF THE INVENTION

One of features of the present invention is to provide a multi-functional integrated upper-lower separation type case, in which various functions (such as an optical-fiber lead-in portion) are integrated, wherein the optical-fiber lead-in portions are each comprised of an optical-fiber open groove and an optical-fiber lead-in groove, the optical-fiber open groove being more receded or deeper, as compared with the optical-fiber lead-in groove. With this structure, at a portion where the optical fiber is led out of the case, i.e. at open portion, the optical fiber and the multi-functional integrated upper-lower separation type case are not brought into contact to each other. As a result, an optical waveguide module-mounted device exhibiting excellent bending strength reliability of the optical fiber can be provided. In addition, the number of parts can be reduced, which attains easy assemblage.

More specifically stated, the present invention provides an optical waveguide module-mounted package containing an optical waveguide module in a separation type case, said module comprising an optical waveguide chip and a pair of optical fibers connected to said optical waveguide chip in the manner that the optical axes of said chip and said fibers are aligned with each other, wherein said separation type case has a pair of optical-fiber lead-in portions, each of said optical-fiber lead-in portion having an open groove at an open portion for leading said optical fiber into said separation type case, and an optical-fiber lead-in groove for positioning the optical fiber, which groove is connected to the inner end of the open groove, said open groove being deeper than said optical-fiber lead-in groove.

Preferably, the position of the open groove and that of the lead-in groove are defined so that the optical fiber is led into the open groove at or near the center of the open portion.

The separation type case preferably has an optical-fiber fixing groove which is connected to the inner end of the optical-fiber lead-in groove, and an optical waveguide-chip fixing groove for fixing the optical waveguide module, which groove is connected to the inner end of the optical-fiber fixing groove and is deeper than the optical-fiber fixing groove.

The separation type case is formed by combining two identical half cases, each half case being provided with a mating surface having one or more recess-protrusion pairs for fitting, said recess and said protrusion being fitted respectively over the protrusion and in the recess of the other half case.

The mating surfaces of the two half cases forming said separation type case are adhered to each other with a sealant, and preferably, the above-mentioned open groove is filled with a flexible sealant or resin.

DESCRIPTION OF THE PREFERABLE EMBODIMENT

Figure 1:
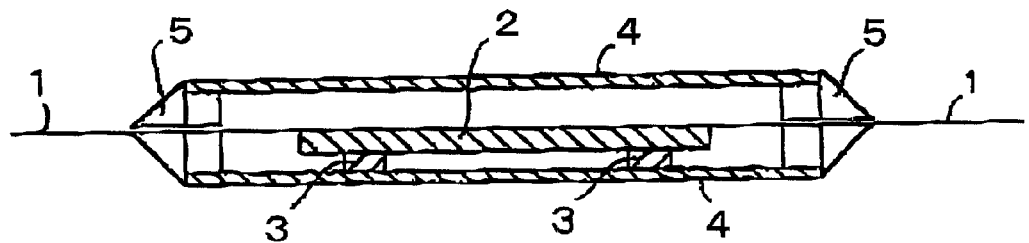
FIG. 1 shows a cross section of a conventional optical waveguide module-mounted device of cylindrical type.
Figure 2:
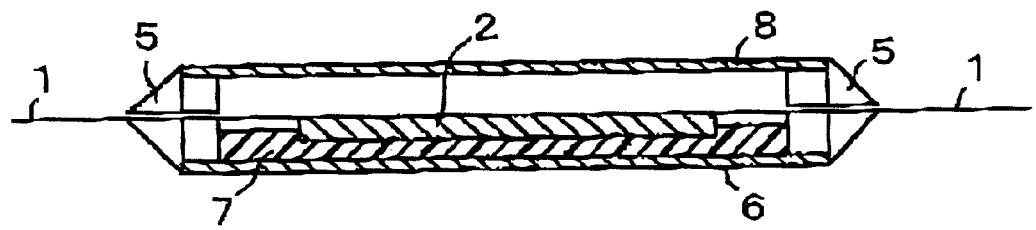
FIG. 2 shows a cross section of another conventional optical waveguide module-mounted device of upper-lower separation type.
Figure 3:
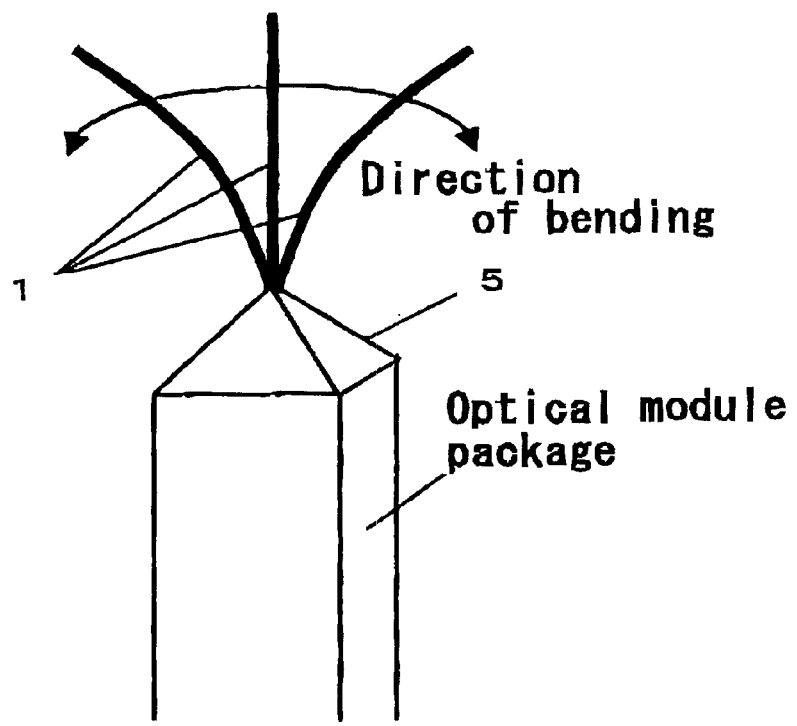
FIG. 3 shows a schematic drawing explaining bending strength of the optical fiber.
Figure 4:
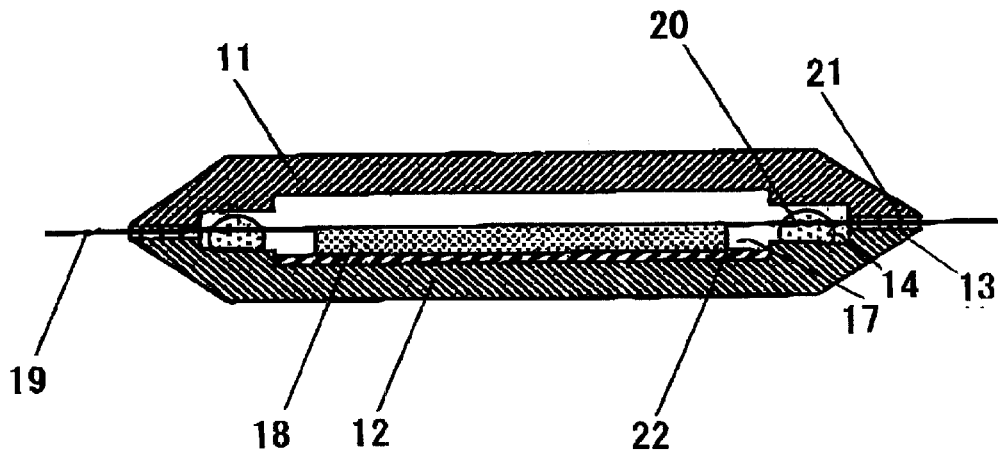
FIG. 4 shows a cross section of the optical waveguide module-mounted device (multi-functional integrated upper-lower separation type) according to the prior application by the present inventors.
Figure 5:
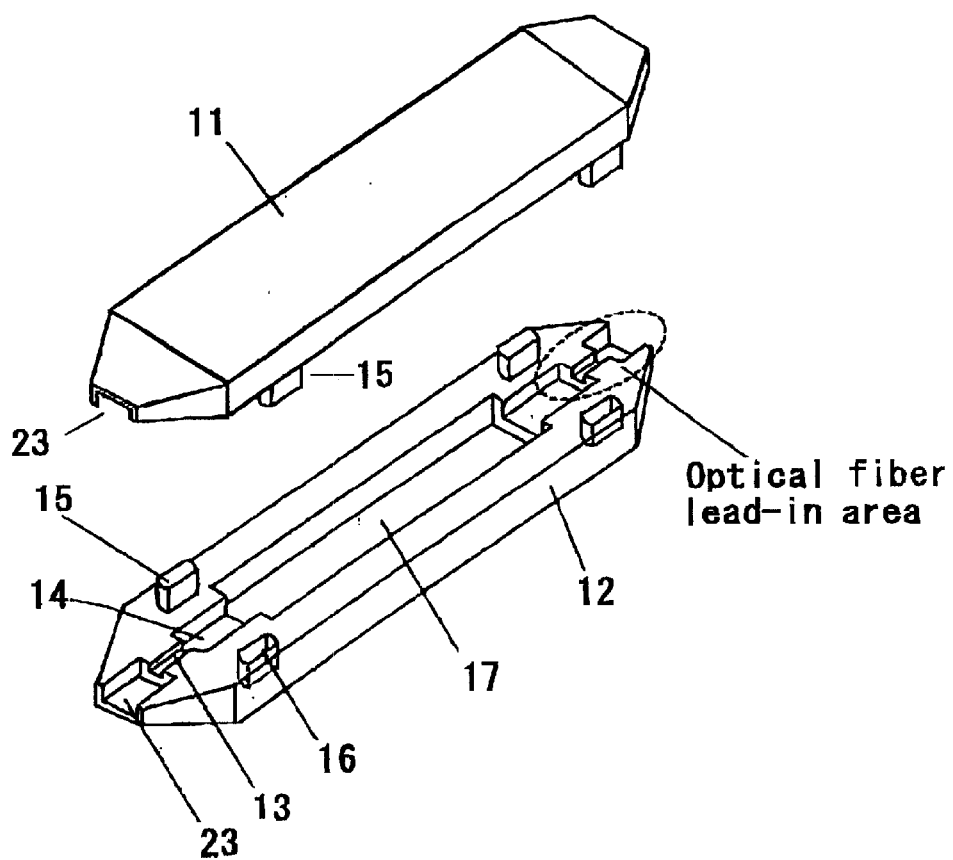
FIG. 5 shows a perspective of the upper-lower separation type case, each half case thereof having protrusions and recesses for fitting, according to one embodiment of the present invention.

FIG. 5 shows a perspective of the upper-lower separation type case, each of half case thereof having protrusions and recesses for fitting, according to one embodiment of the present invention.

Each of the multi-functional integrated separation type case comprises upper and lower half cases 11 and 12, an optical waveguide-chip fixing groove 17, optical-fiber fixing grooves 14 and optical-fiber open grooves 23. The upper half case 11 and the lower half case 12 are sealed by adhering them together. The upper half case 11 and lower half case 12 have identical structure, with protrusions and recesses for fitting. A protrusion 15 and a recess 16 for positioning are located near each end (i.e. two pairs in total for each half case), which allows the fitting together of the upper half case 11 and the lower half case 12, both having the identical structure. By fitting the protrusion 15 of the upper half case in the recess 16 of the lower half case, and the recess (not shown) of the upper half case over the protrusion 15 of the lower half case, the upper half case 11 and lower half case 12 are easily assembled and bonded together, thereby facilitating positioning, leading to improvement in workability. Each of the optical-fiber lead-in area or portion is comprised of an optical-fiber open groove 23 and an optical-fiber lead-in groove 13. The optical-fiber open groove 23 is deeper than the optical-fiber lead-in groove 13 and the step is provided between them. When a resin is selected as the material of the half cases 11 and 12, injection molding can be used for producing the cases, and when metal is selected, metal injection method can be used.

Figure 6:
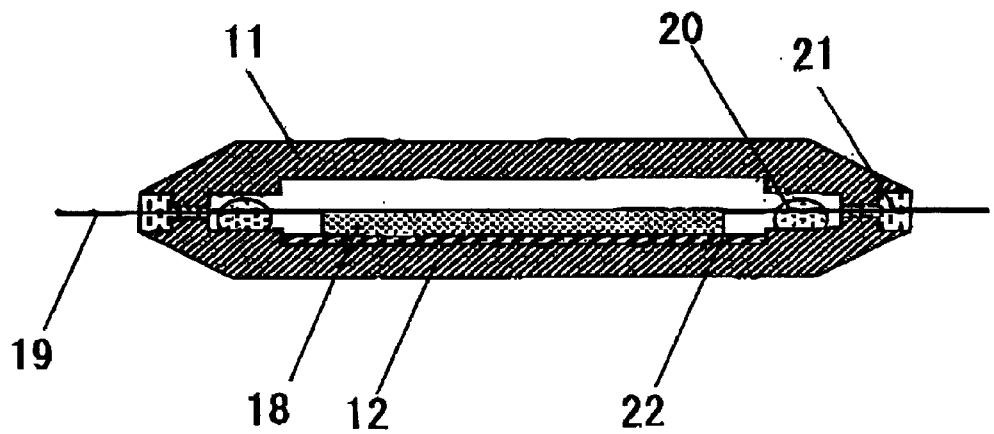
FIG. 6 shows a cross section of the optical waveguide module-mounted device according to one embodiment of the present invention.

FIG. 6 shows a cross section of the optical waveguide module-mounted device 10 using the case according to FIG. 5. The multi-functional integrated optical waveguide module comprising an optical waveguide chip 18 and optical fibers 19 connected to the chip in such manner that their optical axes are aligned with each other, is contained in the upper-lower separation type case composed of the upper half 11 and the lower half case 12, which case are adhered via fitting of protrusions 15 and recesses 16. The optical fiber 19 is led in the fixing groove 17 of the case for fixing the optical waveguide chip 18, via an optical-fiber open groove 23 and a fiber lead-in groove 13.

The multi-functional integrated upper-lower separation type case has two optical-fiber fixing grooves (fixing portions) 14, and the optical fibers 19 are fixed to the groove by a resin 20 for fixing optical fiber. It is desired that the resin 20 for fixing optical fiber has ability to absorb the difference in coefficients of linear expansion of the optical fibers 19, the optical waveguide chip 18, the upper half case 11 and the lower half case 12 of the upper-lower separation type case; and that the resin securely adheres the optical fibers 19 to the half cases 11 and 12 of the upper-lower separation type case. Examples of such resins include a flexible thermosetting silicon resin and a flexible UV-setting resin. When more adhesion is required, the resin can be applied between the back surface of the optical waveguide chip and the corresponding portion of the case.

In the case, the inner bottom surface of the optical waveguide-chip fixing groove 17, with which the back surface of the optical waveguide chip contacts, is receded the most, in order to accommodate the thickness of the optical waveguide chip. The optical-fiber fixing groove 14 is stepwise receded from the level of the fiber lead-in groove 13, and the depth becomes shallower in this order. By providing this step between the optical-fiber fixing groove 14 and the fiber lead-in groove 13 in the depth direction, leaking of the resin used for fixing the optical fiber to the outside can be prevented, which may occur via the fiber lead-in groove. It is more preferred that another step be provided between the fixing groove 17 and the fixing groove 14 in the same manner.

The upper half case and the lower half case of the upper-lower separation type case are adhered to each other by means of a sealant 21 exhibiting excellent moisture-proof. The sealant 21 prevents the inside of the case from exposing to moisture, and deterioration in the properties of the connection part between the optical waveguide 18 and the optical fibers 19 can be avoided. When more moisture-proof is required, the space inside the case can be filled with resin having a low moisture permeability, or the surface of the optical waveguide module can be coated with resin having a low moisture permeability. In addition, the optical fiber tend to have microbend loss (local bend loss), after it underwent stress. In general, a rigid sealant will generate internal stress due to the difference in coefficients of thermal expansion, and when the sealant is subjected to lower temperatures, it shrinks, increasing the amount of light loss. Therefore, a sealant having some flexibility is preferred.

Figure 7:
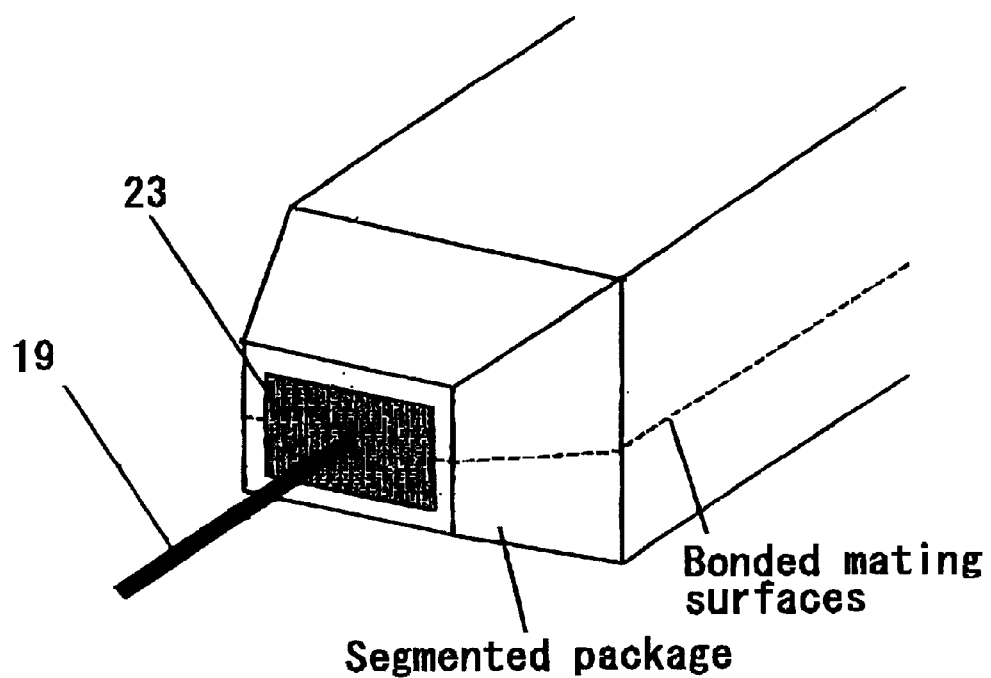
FIG. 7 shows an enlarged perspective of the optical-fiber open portion of the optical waveguide module-mounted device according to one embodiment of the present invention.

The depth of each groove is designed so that the level of the optical fiber becomes the same as that of the mating surface of the case. The optical-fiber lead-in portion is comprised of an optical-fiber open groove 23 and an optical-fiber lead-in groove 13. The optical-fiber open groove 23 is stepwise receded from the level of the optical-fiber lead-in groove 13. As the result, the optical fiber 19 extends to the outside from the center or near the center of the multi-functional integrated upper-lower separation type case, adhered together by the sealant. In other words, the space in the optical-fiber open portion 23 of the optical waveguide module-mounted device of the present invention is filled with a flexible sealant 21 as shown in FIG. 7. Therefore, at the optical-fiber open portion 23, the optical fiber is never brought into contact with the rigid case even when the fiber is bent, thus the lowering of bending strength reliability of the optical fiber can be prevented.

Figure 8:
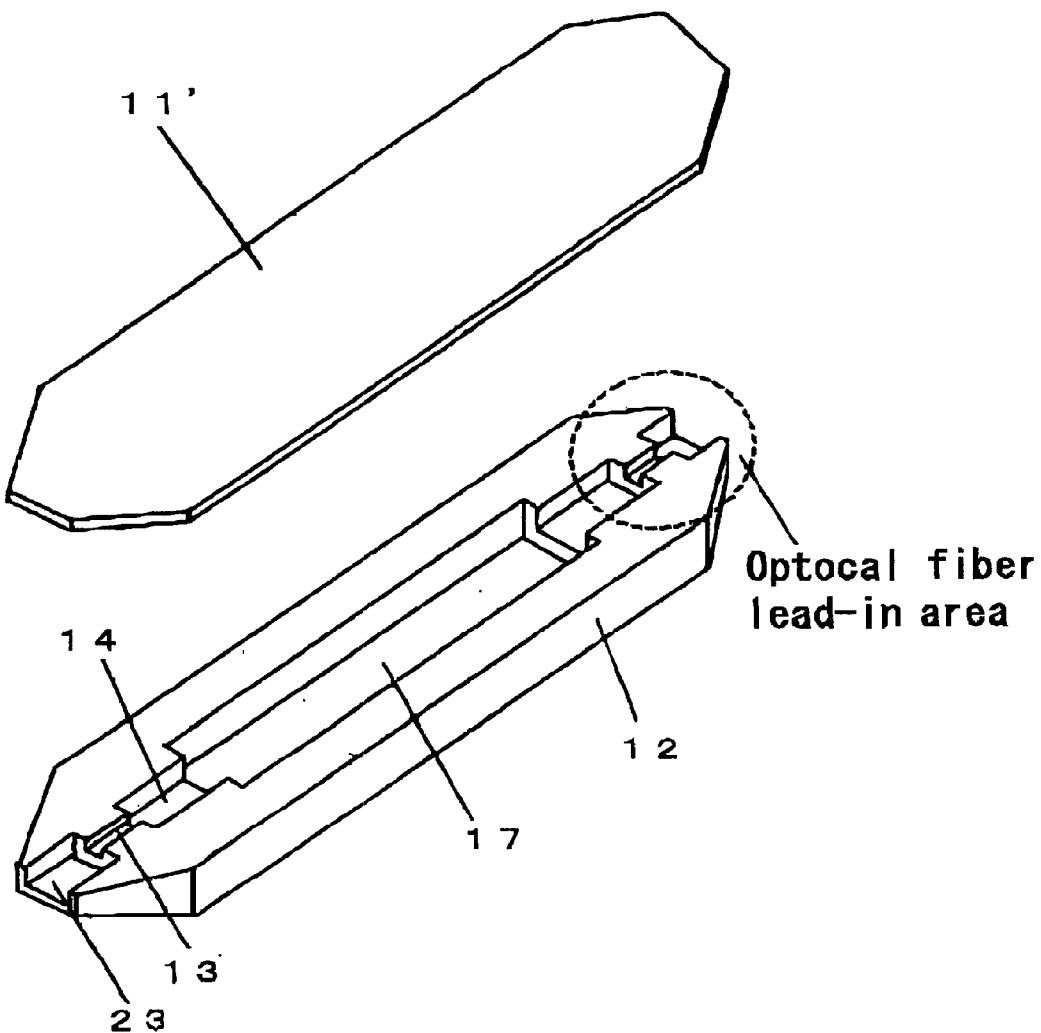
FIG. 8 shows a perspective of the multi-functional integrated upper-lower separation type case according to another embodiment of the present invention, in which the upper half case is in the form of plate.

FIG. 8 shows a perspective of another embodiment according to the present invention, in which a multi-functional integrated upper-lower separation type case has an upper half case 11' in a form of plate. Since the upper half case 11' is in the form of plate as compared with FIG. 5, if the depth of the grooves of the multi-functional integrated upper-lower separation type case is designed so that the level of the optical fiber becomes the same as that of the mating surface of the half case 11', the optical fiber is brought into contact with the upper half case 11'. Therefore, in this embodiment, the depth of the optical-fiber lead-in groove 13 is designed to be deeper than in the first embodiment, so that the optical fiber passes the center or near the center of the optical-fiber open groove 23 in terms of depth, and thus the lead-in groove is aligned with the center or near the center of the optical-fiber open groove 23 in terms of depth.

As explained above, the present invention provides a multi-functional integrated upper-lower separation type case, in which various functions (such as an optical-fiber lead-in portion) are integrated, wherein the optical-fiber lead-in portion is comprised of an optical-fiber open groove and an optical-fiber lead-in groove, which optical-fiber open groove is more receded or deeper, as compared with the optical-fiber lead-in groove. With this structure, at a portion where the optical fiber is led out of the case, i.e. at open portion, the optical fiber and the multi-functional integrated upper-lower separation type case are not brought into contact to each other. As a result, an optical waveguide module-mounted device exhibiting excellent bending strength reliability of the optical fiber can be provided. In addition, the number of parts can be reduced, which attains easy assemblage.

What is claimed is:

1. An optical waveguide module-mounted device, comprising:

an optical waveguide module which comprises an optical waveguide chip and a pair of optical fibers connected to the optical waveguide chip in the manner that the optical axes of the chip and the fibers are aligned with each other; and a separation type case having an optical waveguide chip fixing groove in which said optical wave guide chip is fixed, an optical-fiber open groove at each axial end of the case for leading the optical fiber into the case, and an optical-fiber lead-in groove, for positioning the optical fiber, in communication with the inner end of the open groove, said optical waveguide chip fixing groove in communication with the inner end of the optical-fiber lead-in groove, wherein the open groove is deeper than the optical-fiber lead-in groove such that the optical fiber can be bent in said open groove.

2. The optical waveguide module-mounted device according to claim 1, wherein the open groove and the lead-in groove are positioned so that the optical fiber is led into the open groove at or near the center of the open portion.

3. The optical waveguide module-mounted device according to claim 1 wherein the separation type case has an optical fiber fixing groove in communication with the inner end of the optical-fiber lead-in groove and the optical waveguide chip fixing groove is in communication with the inner end of the optical-fiber fixing groove.

4. An optical waveguide module-mounted device according to claim 2, wherein the separation type case has an optical-fiber fixing groove in communication with the inner end of the optical-fiber lead-in groove and the optical waveguide-chip fixing groove is connected to the inner end of the optical-fiber fixing groove.

5. An optical waveguide module-mounted device according to claim 1, wherein the separation type case is formed by combining two identical half cases, each half case being provided with a mating surface having one or more recess-protrusion pairs for fitting, the recess and the protrusion being fitted respectively over the protrusion and in the recess of the other half case.

6. An optical waveguide module-mounted device according to claim 2, wherein the separation type case is formed by combining two identical half cases, each half case being provided with a mating surface having one or more recess-protrusion pairs for fitting, the recess and the protrusion being fitted respectively over the protrusion and in the recess of the other half case.

7. An optical waveguide module-mounted device according to claim 3, wherein the separation type case is formed by combining two identical half cases, each half case being provided with a mating surface having one or more recess-protrusion pairs for fitting, the recess and the protrusion being fitted respectively over the protrusion and in the recess of the other half case.

8. An optical waveguide module-mounted device according to claim 4, wherein the separation type case is formed by combining two identical half cases, each half case being provided with a mating surface having one or more recess-protrusion pairs for fitting, the recess and the protrusion being fitted respectively over the protrusion and in the recess of the other half case.

9. An optical waveguide module-mounted device according to claim 1, wherein the mating surfaces of the two half cases forming the separation type case are adhered to each other with a sealant, and the open groove is filled with a flexible sealant or resin.

10. An optical waveguide module-mounted device according to claim 2, wherein the mating surfaces of the two half cases forming the separation type case are adhered to each other with a sealant, and the open groove is filled with a flexible sealant or resin.

11. An optical waveguide module-mounted device according to claim 3, wherein the mating surfaces of the two half cases forming the separation type case are adhered to each other with a sealant, and the open groove is filled with a flexible sealant or resin.

12. An optical waveguide module-mounted device according to claim 4, wherein the mating surfaces of the two half cases forming the separation type case are adhered to each other with a sealant, and the open groove is filled with a flexible sealant or resin.

13. An optical waveguide module-mounted device according to claim 5, wherein the mating surfaces of the two half cases forming the separation type case are adhered to each other with a sealant, and the open groove is filled with a flexible sealant or resin.

14. An optical waveguide module-mounted device according to claim 6, wherein the mating surfaces of the two half cases forming the separation type case are adhered to each other with a sealant, and the open groove is filled with a flexible sealant or resin.

15. An optical waveguide module-mounted device according to claim 7, wherein the mating surfaces of the two half cases forming the separation type case are adhered to each other with a sealant, and the open groove is filled with a flexible sealant or resin.

16. An optical waveguide module-mounted device according to claim 8, wherein the mating surfaces of the two half cases forming the separation type case are adhered to each other with a sealant, and the open groove is filled with a flexible sealant or resin.

* * * * *